United States Patent [19]

Siemers

[11] 4,247,249
[45] Jan. 27, 1981

[54] TURBINE ENGINE SHROUD

[75] Inventor: Paul A. Siemers, Clifton Park, N.Y.

[73] Assignee: General Electric Company, Schenectady, N.Y.

[21] Appl. No.: 944,891

[22] Filed: Sep. 22, 1978

[51] Int. Cl.$^2$ ............... F01D 11/08; C04B 35/00; C04B 35/48

[52] U.S. Cl. .............. 415/174; 415/197; 415/200; 277/96.2; 60/200 A; 106/57; 106/65; 106/73.2

[58] Field of Search ............ 415/174, 197, 200, 214; 418/152; 60/200 A; 277/DIG. 6, 96.2; 106/DIG. 57, 65, 73.2, 73.1, 55

[56] References Cited

U.S. PATENT DOCUMENTS

| | | | |
|---|---|---|---|
| 3,843,400 | 9/1972 | Radford et al. | 429/192 |
| 3,879,831 | 4/1975 | Rigney et al. | 415/174 |
| 4,087,199 | 5/1978 | Hemsworth et al. | 415/174 |
| 4,128,433 | 12/1978 | Manning | 106/65 |

OTHER PUBLICATIONS (60-8056) Ryshkewitch, Eugene, *Oxide Ceramics*, Academic Press, N.Y. 1960, pp. 338–389.

Gitzen, Walter, *Alumina as a Ceramic Material*, American Ceramic Society, Columbus, OH, 1970, pp. 146–147.

*Primary Examiner*—Carlton R. Croyle
*Assistant Examiner*—A. N. Trausch, III
*Attorney, Agent, or Firm*—William A. Teoli; James C. Davis, Jr.

[57] ABSTRACT

High temperature resistant turbine engine shrouds are formed of an amphoteric refractory oxide, a phosphate binding agent and optionally a stabilizer, reinforcement and/or porosity controller.

7 Claims, No Drawings

TURBINE ENGINE SHROUD

BACKGROUND OF THE INVENTION

This invention relates to gas turbine engines and more particularly to engines having a shroud surrounding the tips of the rotor blades in the turbine section of the engine. In a gas turbine engine of the type referred above, pressurized air and fuel are burned in a combustion chamber to add thermal energy to the medium gases flowing therethrough. The effluent from the chamber comprises high temperature gases which are flowed downstream in an annular flow path through the turbine section of the engine. Nozzle guide vanes at the inlet to the turbine direct the medium gases onto a multiplicity of blades which extend radially outward from the engine rotor. An annular shroud which is supported by the turbine case surrounds the tips of the rotor blades to contain the medium gases flowing thereacross to the flow path. The clearance between the blade tips and the shroud is minimized to prevent the leakage of medium gases around the tips of the blades.

A limiting factor in many turbine engine designs is the maximum temperature of the medium gases which can be tolerated in the turbine without adversely limiting the durability of the individual components. The shrouds which surround the tips of the rotor blades are particularly susceptible to thermal damage. In addition, because of the close tolerances between the tips of the rotor blades and the arcuate segments comprising the shroud and the various stresses to which the engine components are subjected, the blade tips are caused to rub against the sealing surface of the shroud segment. Thus, the shroud material must be rub-tolerant so that it will not damage the blade tips and be unduly abraided by any limited contact. It is the provision of such a gas turbine engine shroud material to which this invention is directed.

BRIEF DESCRIPTION OF THE INVENTION

It has now been discovered that a sealing surface for use in a gas turbine engine shroud suitable for use in aircraft engines and the like can be made to have both excellent high temperature and rub properties. More particularly, the sealing surface of the shroud which opposes the tips of the blades is formed of an amphoteric refractory oxide matrix, a phosphate binder and optionally a stabilizer, reinforcement and/or porosity controller.

DETAILED DESCRIPTION OF THE INVENTION

Phosphate suitable for use in bonding the shroud matrix materials of the invention should be stable at the engine temperatures which are employed or stable at temperatures above about 1350° C. Exemplary of suitable phosphates are aluminum phosphate ($AlPO_4$) and zirconium pyrophosphate ($Zr_2P_2O_7$). Mixtures of phosphates can also be employed as well as phosphoric acid ($H_3PO_4$) as it will form a stable phosphate during the reaction.

Amphoteric refractory oxides which can be employed as matrix materials are those which are stable at the high temperatures required and preferably have a thermal coefficient of expansion similar to that of the superalloy metal shroud block as well as a low thermal conductivity so as to require less cooling. In addition, they are preferably stable in both oxidizing and reducing environments. Exemplary of suitable materials are alumina ($Al_2O_3$), ceria ($CeO_2$), thoria ($ThO_2$), stabilized hafnia ($HfO_2$), and stabilized zirconia ($ZrO_2$). Stabilized zirconia is preferred because its thermal coefficient of expansion is closest to high temperature airplane metals currently in use and it has a low thermal conductivity requiring less cooling than other materials. The ratio of amphoteric oxide to bonding agent can be from about 8:1 to 2:1.

Stabilizers which can be employed are those which are stable at the engine temperatures employed or stable at temperatures above about 1350° C. and which prevent a monoclinic to tetragonal transformation in zirconia or hafnia. Suitable stabilizers include yttria ($Y_2O_3$), magnesia (MgO), and calcia (CaO) or a rare earth oxide. Typical rare earth oxides include: erbia, europia, scandia and ytterbia. Yttria is preferred particularly in combination with zirconia or hafnia. The amount of stabilizer employed will depend upon the particular stabilizer, the matrix material and other variables but generally from about 4% to 50% by weight of the matrix material is sufficient. Particulate filler to include reinforcement or porosity control material includes a variety of materials which are preferably included but not always required. For example, materials such as graphite are burned off at the high temperatures encountered in turbine engines but are useful in controlling the porosity and subsequent hardness of the bonded amphoteric refractory oxide. Other materials such as sawdust or plastic filler serve the same purpose. Reinforcing materials which do not burn out at the elevated temperatures encountered include silicon carbide fibers (whiskers) which serve to improve the fracture toughness and thermal shock resistance of the composite. Other materials which can be employed include fibrous refractory oxides such as alumina or zirconia. Reinforcing materials, such as the silicon carbide whiskers preferably have a length of between about 3–10 mm, a thickness of approximately 0.04–0.1 mm and a width of 0.1–0.5 mm.

Particle sizes of the amphoteric refractory oxide matrix materials are preferably from about submicron to 40 microns so as to provide more complete reaction although coarser particles up to 100 microns may be used as fillers. The materials can be prepared by mixing the amphoteric refractory oxide, phosphate containing material, and an amount of particulate filler material of between about 0 and about 25 weight percent sufficient to provide the desired porosity and rub properties and sufficient distilled water added to form a pourable paste which can be cast. The paste is heated for between about 4 and about 48 hours at a relatively low temperature between about 80° C. and about 120° C. until dried to set the paste and then cured at an intermediate temperature between about 120° C. and about 160° C. for between about 1 hour and about 24 hours to remove most free water and finally cured at elevated temperature between 500° C. and about 1000° C. for between about 1 hour and about 24 hours to eliminate all chemically combined water so that the cement cannot be redissolved.

Employing conventional molds and materials the resultant material can be cast and cemented in a conventional metal turbine engine shroud block to provide a sealing surface and rub tolerant shroud material.

The following examples will serve to illustrate the invention and preferred embodiments thereof. All parts and percentages in said examples and elsewhere in the specification and claims are by weight unless otherwise specified.

EXAMPLE 1

To a plastic crucible were added 20 grams −325 U.S. mesh $ZrO_2$ stabilized with 12% $Y_2O_3$ (Zirconium Corporation of America), 5 grams of submicron particle size $ZrO_2$ (Zircar Products Inc.) and 3.75 grams of α-SiC whiskers. The materials were thoroughly mixed to form a nearly homogeneous dry mixture. To this mixture was added 8 grams of 85% $H_3PO_4$, and to 2 grams of distilled $H_2O$ to form a pourable paste which was cast into 4.91×2.45×0.58 cm mold. The paste was heated at 100° C. for 4 hours in an electric muffle furnace until the paste had set to become free standing. It was further heated at 150° C. for an additional 2 hours until dry and further cured at 600° C. for 4 hours. The material had a superficial Rockwell hardness of 93 using a ½" steel ball indenter and a 15 Kg load. Rub tests showed that the material had good abraidability. The material had an open porosity of about 30%.

A sample was then cut from the bar with a diamond wheel and the integrity of the sample was maintained when it was repeatedly heated to near white heat in an oxygen-methane flame and immediately plunged into cold water. Thus the material had excellent thermal shock resistance.

EXAMPLE 2

To a plastic container were added 20 grams of −325 U.S. mesh $ZrO_2$ stabilized with 12% $Y_2O_3$, and 3 grams of α-SiC whiskers. The material were thoroughly dry mixed and to this mixture was added 10 grams of $Al(H_2PO_4)_3$ solution. The material was packed into a 5.32×2.53×0.63 cm mold which was heated for 12 hours at 80° C., 2 hours at 100° C., and 2 hours at 120° C. until completely set. An additional heating of 2 hours at 200° C. and 6 hours at 600° C. completed the heat treatment. The cured material had a density of 2.74 g/cm$^4$ and had good particulate erosion resistance.

EXAMPLES 3-5

To a plastic crucible is added 20 grams of a −325 U.S. mesh oxide or hydroxide of thorium, hafnium or cerium with 3 grams of α-SiC whiskers. The materials are thoroughly dry mixed to form a homogeneous mixture and to this mixture is added 8 grams of phosphoric acid or 10 grams of $Al(H_2PO_4)_3$. The materials are further mixed to form a paste or pourable mixture and are cast in the desired mold or aircraft engine shroud block. A heat treatment of 4-25 hours at a temperature of 80°-120° C. causes setting and further gradual heating to 600° C. causes final curing. The final materials have essentially the same properties as the materials described in examples 1 and 2, but the thermal expansion coefficients are similar to the expansion coefficient of the refractory oxide used.

Those skilled in the art will understand that the examples are intended to be illustrative of preferred compositions and are intended to be nonlimiting except as defined by the appended claims.

I claim:

1. In a gas turbine engine, a shroud comprising a plurality of arcuate segments disposed in end to end relationship to surround the tips of the rotor blades of the engine wherein each segment has a sealing surface which opposes the tips of the blades wherein the sealing surface is formed of an amphoteric refractory oxide matrix of material selected from $ZrO_2$, $Al_2O_3$, $Ce_2O$, $ThO_2$ and $HfO_2$ or mixture, a phosphate binding agent stable above about 1350° C., and from 0 to 50% by weight of the matrix material of a stabilizer selected from $Y_2O_3$, MgO, CaO, rare earth oxide or mixture and from 0 to 25% by weight of the matrix material of a filler.

2. The shroud of claim 1 wherein the amphoteric refractory oxide is $ZrO_2$.

3. The shroud of claim 2 wherein from 4 to 50% of a stabilizer is employed of $Y_2O_3$.

4. The shroud of claim 1 wherein a mixture of phosphate is employed of $H_3PO_4$ and $AlPO_4$.

5. The shroud of claim 1 wherein a filler is employed of up to 25% of the matrix material selected from graphite, silicon carbide whisker and mixtures.

6. The shroud of claim 1 wherein the matrix material is selected from $ZrO_2$, $HfO_2$ and mixtures and the stabilizer is selected from $Y_2O_3$, MgO, CaO and mixtures.

7. The shroud of claim 1 wherein the sealing surface is formed of $ZrO_2$ stabilized with $Y_2O_3$, $H_3PO_4$ and silicon carbide whiskers.

* * * * *